US012459154B2

(12) United States Patent
Yao et al.

(10) Patent No.: US 12,459,154 B2
(45) Date of Patent: Nov. 4, 2025

(54) CORDLESS SAW HAVING IMPROVED CUTS PER BATTERY CHARGE

(71) Applicant: Black & Decker Inc., New Britain, CT (US)

(72) Inventors: HuaMing Yao, Suzhou (CN); Yue Tian, Jiangsu (CN); Jun Liu, Suzhou (CN); Torrey R. Lambert, White Hall, MD (US); John S. Maceo, Jr., Annapolis, MD (US); Jason D. McKillican, Baltimore, MD (US); YanJuan Zou, JiangSu (CN)

(73) Assignee: BLACK & DECKER INC., New Britain, CT (US)

(*) Notice: Subject to any disclaimer, the term of this patent is extended or adjusted under 35 U.S.C. 154(b) by 193 days.

(21) Appl. No.: 18/219,388

(22) Filed: Jul. 7, 2023

(65) Prior Publication Data
US 2024/0009882 A1    Jan. 11, 2024

Related U.S. Application Data

(60) Provisional application No. 63/359,940, filed on Jul. 11, 2022.

(51) Int. Cl.
*H02P 3/14* (2006.01)
*B27B 5/38* (2006.01)
(Continued)

(52) U.S. Cl.
CPC .......... *B27B 5/38* (2013.01); *B27B 9/00* (2013.01); *H02J 7/1415* (2013.01); *H02P 3/14* (2013.01)

(58) Field of Classification Search
CPC ..... B27B 5/38; B27B 9/00; H02P 3/14; H02J 7/1415
See application file for complete search history.

(56) References Cited

U.S. PATENT DOCUMENTS 6,653,806 B1 * 11/2003 Ono ................... H02P 3/22
                                                    318/378
7,023,159 B2 * 4/2006 Gorti ................... H02P 3/12
                                                    318/432
(Continued)

FOREIGN PATENT DOCUMENTS

EP    2762277 A1    8/2014
EP    3267574 A1    1/2018
(Continued)

OTHER PUBLICATIONS

Extended European Search Report dated Nov. 27, 2023 in corresponding EP application No. 23184390.5, 14 pages.

*Primary Examiner* — Thai T Dinh
(74) *Attorney, Agent, or Firm* — Amir R. Rohani

(57) ABSTRACT

A cordless aw is provided with regenerative braking means that increases the number of repeated cuttings the saw is able to perform (x) per full discharge cycle of the battery pack, as compared to the number of repeated cuttings achievable by the same saw not employing a regenerative braking means (y) per full discharge cycle of the battery pack, such that x/y is approximately at least one of the following: i) 1.1 when cutting a Pressure-Treated (PT) lumber workpiece having a cross-sectional size of approximately 89 mm×89 mm±2 mm, ii) 1.15 when cutting a Spruce Pine Fir (SPF) lumber workpiece having a cross-sectional size of approximately 38 mm×89 mm±2 mm, or iii) 1.25 when cutting Medium Density Fiberboard (MDF) workpiece having a thickness of approximately 19 mm±1 mm and a width of approximately 76 mm±2 mm.

15 Claims, 10 Drawing Sheets

(51) Int. Cl.
  *B27B 9/00*    (2006.01)
  *H02J 7/14*    (2006.01)

(56) References Cited

U.S. PATENT DOCUMENTS

| | | | | |
|---|---|---|---|---|
| 10,666,168 | B2* | 5/2020 | Takeda | H02P 3/18 |
| 11,201,572 | B2* | 12/2021 | Obermann | B25F 5/00 |
| 2014/0215839 | A1* | 8/2014 | Abe | B25F 5/001 |
| | | | | 30/388 |
| 2017/0373615 | A1* | 12/2017 | Lewis | H02K 7/145 |
| 2019/0084107 | A1* | 3/2019 | Yabuguchi | H02P 6/24 |
| 2021/0091687 | A1* | 3/2021 | Obermann | H02P 3/22 |

FOREIGN PATENT DOCUMENTS

| | | | | |
|---|---|---|---|---|
| EP | 4180183 | A1 | | 5/2023 |
| JP | 2016172302 | A | * | 9/2016 |
| JP | 2019098486 | A | | 6/2019 |
| JP | 2020032501 | A | | 3/2020 |

* cited by examiner

CORDLESS SAW HAVING IMPROVED CUTS PER BATTERY CHARGE

RELATED APPLICATION

This application claims the benefit of U.S. Provisional Patent Application No. 63/359,940 filed Jul. 11, 2022, which is incorporated herein by reference in its entirety.

FIELD

This disclosure relates to power tools, and in particularly to cordless saw able to achieve an improved number of cuts per full battery discharge cycle.

BACKGROUND

Cordless power tools provide many advantages to traditional corded power tools. In particular, cordless tools provide unmatched convenience and portability. An operator can use a cordless power tool anywhere and anytime, regardless of the availability of a power supply. In addition, cordless power tools provide increased safety and reliability because there is no cumbersome cord to maneuver around while working on the job, and no risk of accidently cutting a cord in a hazardous work area.

However, conventional cordless power tools still have their disadvantages. Typically, cordless power tools provide far less power as compared to their corded counterparts. Today, operators desire power tools that provide the same benefits of convenience and portability, while also providing similar performance as corded power tools.

Brushless DC (BLDC) motors have been used in recent years in various cordless power tools. BLDC motors offer many size and power output advantages over universal and permanent magnet DC motors. BLDC motors are electronically-controller via a programmable controller, and thus do not suffer from many mechanical failures associated with universal motor.

An advantage that is sought in cordless power tools is maximizing usage of the power tool for the full discharge cycle of the battery pack. It is highly desirable to maximize the tool efficiency by increasing the number of operations (e.g., cutting operations in a saw) that can be obtain from a single battery pack until the operator is forced to stop work to recharge the battery pack or replace the battery pack with a different fully-charged battery pack.

SUMMARY

According to an embodiment and/or configuration of the invention, a cordless saw for repeated cutting of a workpiece is provided. In an embodiment, the saw includes: a saw housing; a battery connection port formed in the saw housing for receiving a removable battery pack; an electric motor disposed within the housing and configured to rotatably drive an output shaft; a saw blade rotatably driven by the output shaft to perform a plurality of cutting operations on the workpiece; a trigger switch operable by an operator for selective electronic connection or disconnection of a supply of electric power from the battery pack to the electric motor; a power switch circuit disposed between the battery connection port and the electric motor; and a control unit configured to regulate a switching operation of the power switch circuit for each of the plurality of cutting operations to supply electric power from the battery pack to the motor while the trigger switch is depressed and apply an regenerative braking period after the trigger switch is released. In an embodiment, during the regenerative braking period, the control unit applies electronic braking periods to electric motor to slow down the rotation of the electric motor and regenerative charging periods during which a regenerative energy induced by the electric motor charges the battery pack. The regenerative energy is on average at least 33% of the average energy derived from the battery pack during the plurality of cutting operations.

In an embodiment, when the saw blade has a diameter of 304.8 mm±4 mm, the saw is capable of performing, per full discharge cycle of the battery pack, at least 25.3 number of cuts per amp.hour of battery capacity when operating on a Pressure-Treated (PT) lumber workpiece having a cross-sectional size of approximately 89 mm×89 mm±2 mm, at least 40 number of cuts per amp.hour of battery capacity when operating on a Spruce Pine Fir (SPF) lumber workpiece having a cross-sectional size of approximately 38 mm×89 mm±2 mm, or at least 52 number of cuts per amp.hour of battery capacity when operating on a Medium Density Fiberboard (MDF) workpiece having a thickness of approximately 19 mm±1 mm and a width of approximately 76 mm±2 mm.

In an embodiment, when the saw blade has a diameter of 304.8 mm±4 mm and the battery pack has a maximum battery voltage of 20V and a capacity of approximately 6 amp.hours, the saw is capable of performing, per full discharge cycle of the battery pack, at least 152 number of cuts when operating on a Pressure-Treated (PT) lumber workpiece having a cross-sectional size of approximately 89 mm×89 mm±2 mm, at least 240 number of cuts when operating on a Spruce Pine Fir (SPF) lumber workpiece having a cross-sectional size of approximately 38 mm×89 mm±2 mm, or at least 312 number of cuts when operating on a Medium Density Fiberboard (MDF) workpiece having a thickness of approximately 19 mm±1 mm and a width of approximately 76 mm±2 mm.

In an embodiment, when the saw blade has a diameter of 304.8 mm±4 mm and the battery pack has a maximum battery voltage of 20V and a capacity of approximately 9 amp.hours, the saw is capable of performing, per full discharge cycle of the battery pack, at least 228 number of cuts when operating on a Pressure-Treated (PT) lumber workpiece having a cross-sectional size of approximately 89 mm×89 mm±2 mm, at least 360 number of cuts when operating on a Spruce Pine Fir (SPF) lumber workpiece having a cross-sectional size of approximately 38 mm×89 mm±2 mm, or at least 468 number of cuts when operating on a Medium Density Fiberboard (MDF) workpiece having a thickness of approximately 19 mm±1 mm and a width of approximately 76 mm±2 mm.

In an embodiment, each of the plurality of cutting operations includes, prior to the regenerative braking period, a start-up period during which an electric current supplied to the motor ramps up to bring an output speed of the motor to a target speed, followed by a cutting period during which the saw blade engages the workpiece.

In an embodiment, the regenerative braking period is longer than the start-up period. In an embodiment, the regenerative braking period is approximately 1.3 to 1.8 times longer than the start-up period.

In an embodiment, the regenerative braking period is approximately 25% to 36% of the cutting operation.

According to an embodiment and/or configuration of the invention, a cordless saw for repeated cutting of a workpiece is provided. In an embodiment, the saw includes: a saw housing; a battery connection port formed in the saw housing for receiving a removable battery pack; an electric motor disposed within the housing and configured to rotatably drive an output shaft; a saw blade rotatably driven by the output shaft to perform a plurality of cutting operations on the workpiece; a trigger switch operable by an operator for selective electronic connection or disconnection of a supply of electric power from the battery pack to the electric motor; a power switch circuit disposed between the battery connection port and the electric motor; and a control unit configured to regulate a switching operation of the power switch circuit for each of the plurality of cutting operations to supply electric power from the battery pack to the motor while the trigger switch is depressed and apply an regenerative braking period after the trigger switch is released. In an embodiment, during the regenerative braking period, the control unit applies electronic braking periods to electric motor to slow down the rotation of the electric motor and regenerative charging periods during which a regenerative energy induced by the electric motor charges the battery pack. In an embodiment, when the saw blade has a diameter of 304.8 mm±4 mm, the saw is capable of performing, per full discharge cycle of the battery pack, at least 25.3 number of cuts per amp.hour of battery capacity when operating on a Pressure-Treated (PT) lumber workpiece having a cross-sectional size of approximately 89 mm×89 mm±2 mm, at least 40 number of cuts per amp.hour of battery capacity when operating on a Spruce Pine Fir (SPF) lumber workpiece having a cross-sectional size of approximately 38 mm×89 mm±2 mm, or at least 52 number of cuts per amp.hour of battery capacity when operating on a 3¼ Medium Density Fiberboard (MDF) workpiece having a thickness of approximately 19 mm±1 mm and a width of approximately 76 mm±2 mm.

In an embodiment, the regenerative energy is on average at least 33% of the average energy derived from the battery pack during the plurality of cutting operations.

In an embodiment, each of the plurality of cutting operations includes, prior to the regenerative braking period, a start-up period during which an electric current supplied to the motor ramps up to bring an output speed of the motor to a target speed, followed by a cutting period during which the saw blade engages the workpiece.

In an embodiment, the regenerative braking period is longer than the start-up period. In an embodiment, the regenerative braking period is approximately 1.3 to 1.8 times longer than the start-up period.

In an embodiment, the regenerative braking period is approximately 25% to 36% of the cutting operation.

According to an embodiment and/or configuration of the invention, a system for repeated cutting of a workpiece, or workpieces, is provided, the system including a cordless, battery-powered saw, the saw having: a) a saw housing, b) a battery connection port formed in the saw housing for receiving a battery pack to be coupled to the saw, c) an electric motor, mounted in the housing and for selective electrical connection with the battery pack is inserted into the port, d) a saw blade rotatably driven by the motor, e) a trigger switch operably by an operator for selective electronic connection or disconnection to the motor of the battery pack inserted into the port to the motor, and f) a regenerative braking means that controls the operation of the motor. In an embodiment, the motor, when electrically connected to the battery via connection of the switch, provides a rotating output, which rotating output is transferred to the saw blade for performing a workpiece cutting operation. On disconnection of the motor from the battery pack via the switch, the regenerative braking means electronically brakes the motor to stop the rotating output and provides a current path for the electrical charge generated from an angular momentum of the rotating output to be applied to the battery pack. In an embodiment, the system is characterized in that the electrical charge applied to the battery by the regenerative braking means increases the number of repeated cuttings the saw is able to perform (x) per full discharge cycle of the battery pack, as compared to the number of repeated cuttings achievable by the same saw not employing a regenerative braking means (y) per full discharge cycle of the battery pack, such that x/y is approximately at least one of the following: i) 1.1 when cutting a Pressure-Treated (PT) lumber workpiece having a cross-sectional size of approximately 89 mm×89 mm±2 mm, ii) 1.15 when cutting a Spruce Pine Fir (SPF) lumber workpiece having a cross-sectional size of approximately 38 mm×89 mm±2 mm, or iii) 1.25 when cutting Medium Density Fiberboard (MDF) workpiece having a thickness of approximately 19 mm±1 mm and a width of approximately 76 mm±2 mm.

In an embodiment, the electric charge applied to the battery pack is on average at least 33% of the average charge derived from the battery pack over a full discharge cycle of the battery pack.

In an embodiment, when the saw blade has a diameter of 304.8 mm±4 mm, the saw is capable of performing, per full discharge cycle of the battery pack, at least 25.3 number of cuts per amp.hour of battery capacity when operating on the Pressure-Treated (PT) lumber workpiece, at least 40 number of cuts per amp.hour of battery capacity when operating on the Spruce Pine Fir (SPF) lumber workpiece, or at least 52 number of cuts per amp.hour of battery capacity when operating on the Medium Density Fiberboard (MDF) workpiece.

In an embodiment, the saw is configured to perform a series of cutting operations, each including a start-up period, a cutting period, and a ramp-down period, wherein the regenerative braking means is applied during the ramp-down period. In an embodiment, the ramp-down period is controlled to include a duration that is 1.3 to 1.8 times longer than a duration of the start-up period. In an embodiment, the duration of the ramp-down period is approximately 25% to 36% of the duration of the entire cutting operation.

In an embodiment, the duration of the ramp-down period is approximately 25% to 36% of the duration of the entire cutting operation.

BRIEF DESCRIPTION OF THE DRAWINGS

The drawings described herein are for illustration purposes only and are not intended to limit the scope of this disclosure in any way.

Corresponding reference numerals indicate corresponding parts throughout the several views of the drawings.

DETAILED DESCRIPTION

Figure 1:
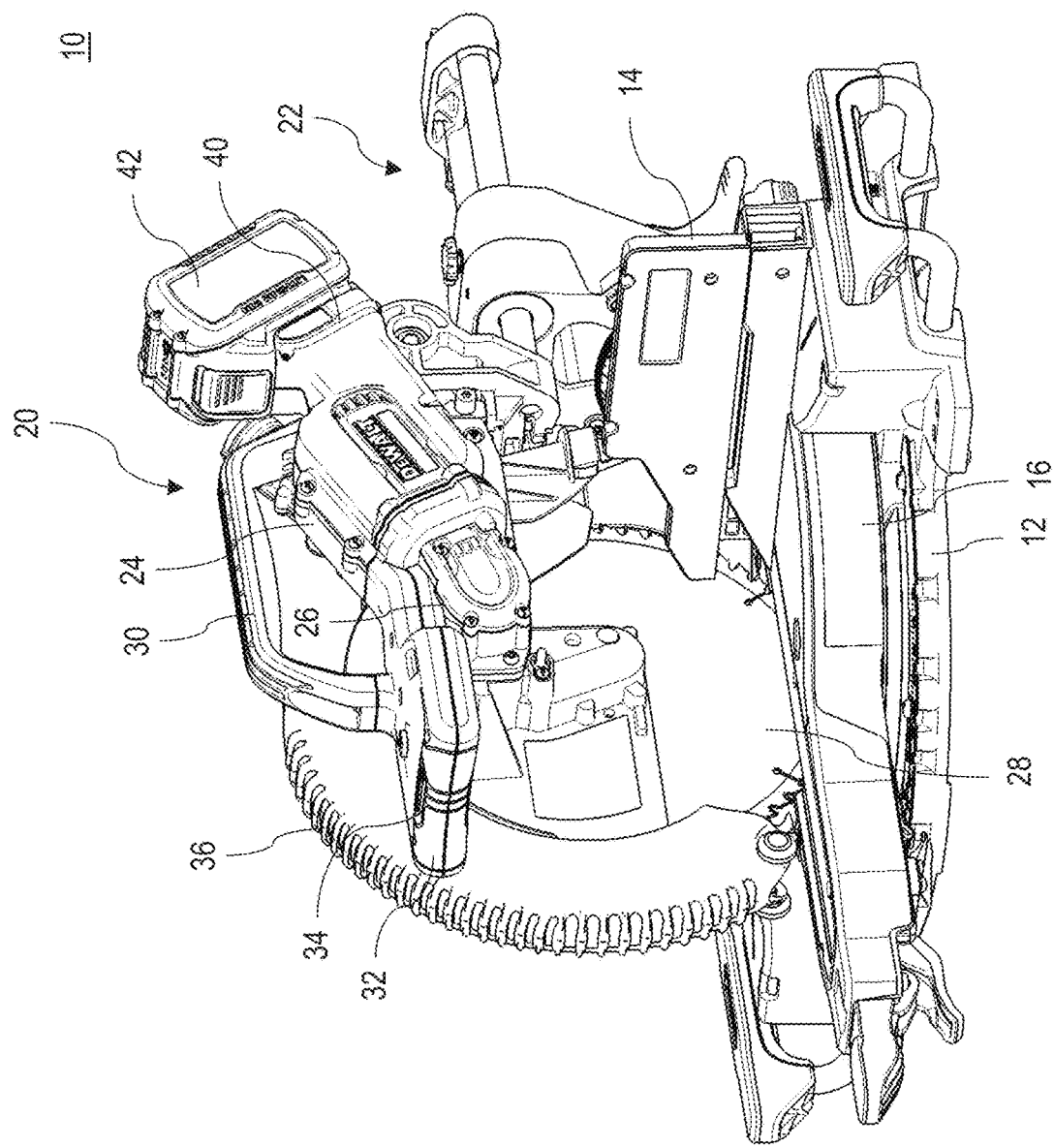
FIG. 1 depicts an exemplary perspective view of an electric power tool, in this example a cordless saw, according to an embodiment.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

Reference is initially made to U.S. Pat. No. 9,406,915, which is incorporated herein by reference in its entirety, for detailed description of a power tool system including high-power (i.e. 60V or above) DC-only or AC/DC power tools having brushless DC (BLDC) motors. Reference is also made to U.S. Pat. No. 10,177,691 as an example of a miter saw executing electronic braking to stop the rotation a saw blade after the completion of a cutting operation.

Figure 2:
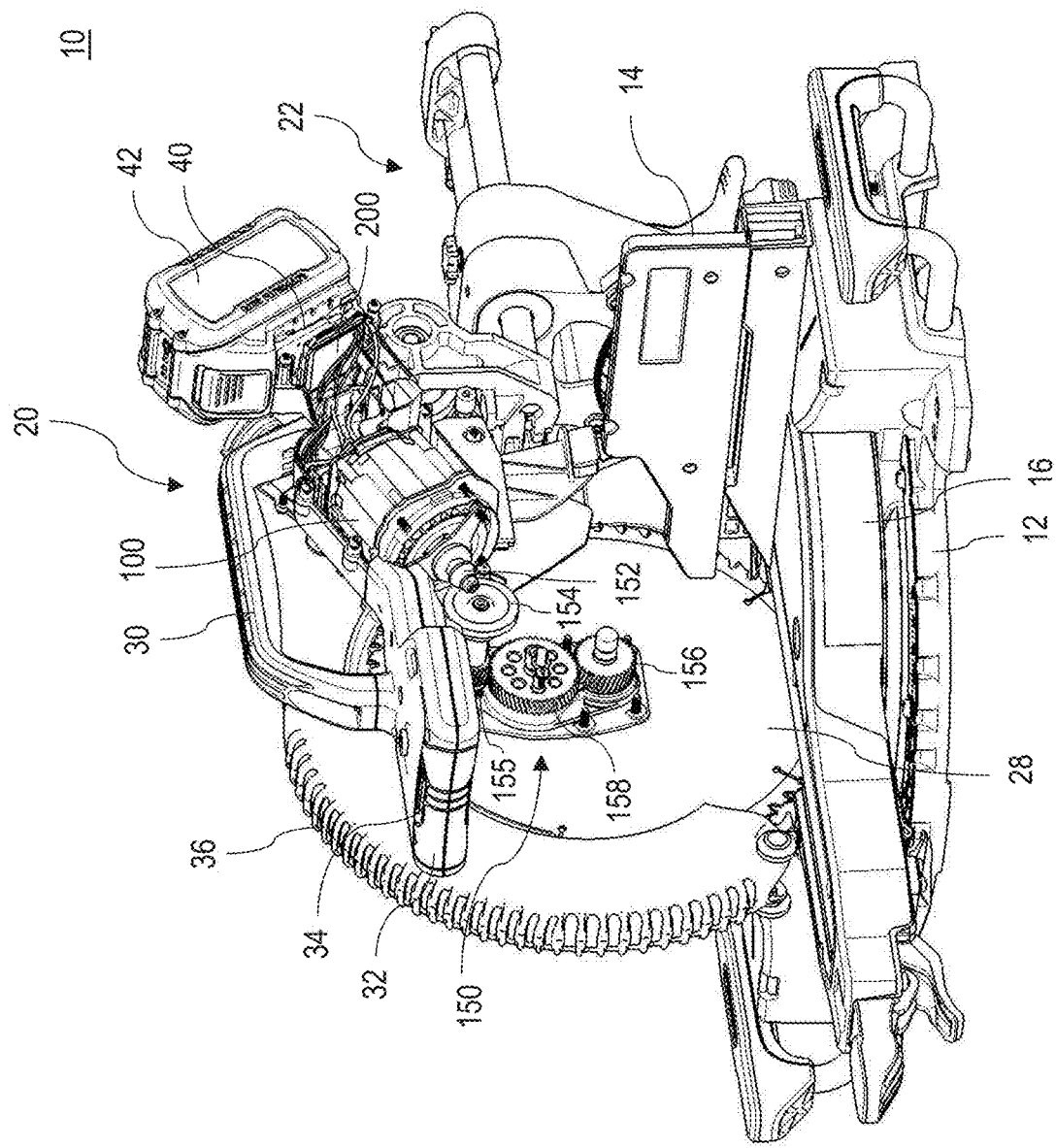
FIG. 2 depicts an exemplary perspective view of the power tool with a side housing removed, according to an embodiment.

FIG. 1 depicts an exemplary high-power power tool, in this case a cordless miter saw 10, according to an embodiment. FIG. 2 depicts an exemplary perspective view of the miter saw 10 with a side housing removed, according to an embodiment.

In an embodiment, miter saw 10 has a generally circular base 12 with an attached fence 14, which base supports a rotatable table 16 that is rotatably adjustable for setting the miter angle of the work piece placed on the table 16. A saw blade and motor assembly, indicated generally at 20, is operatively connected to the table 16 by a linear guide mechanism, indicated generally at 22. The saw blade and motor assembly 20 includes a motor housing 24 housing an electric motor 100 and a gear housing 26 that houses a gear reduction mechanism 150 rotatably connecting a saw blade 28 to the electric motor 100. A handle 30 is used by an operator to carry the saw 10. An auxiliary handle 32 is provided forward of the handle 30 that enables an operator to move the blade and motor assembly 20 into and out of engagement with a work piece that may be placed on the table 16 adjacent the fence 14. Auxiliary handle 32 support a trigger switch 34. The operator activates the motor by actuating the trigger switch 34. A guard 36 is provided to shield an upper area of the blade 28.

The miter saw as illustrated in FIGS. 1 and 2 is illustrative and the teachings of this disclosure may apply to any miter saw, or any other high-power power tool. For more details about an exemplary miter saw, reference is made to U.S. Pat. No. 8,631,734, which is incorporated herein by reference in its entirety.

In an embodiment, the power tool 10 includes one or more battery receptacles 40 formed at an end of the motor housing 24. Battery receptacles 40 may receive a battery pack 42 such as a 60V max battery pack, a 20/60V max convertible battery pack, or a 20V max battery pack. Battery pack 42 supplies DC electric power to power the motor 100. In an embodiment, a power and control module 200 is disposed along the current path from the battery pack 42 to the motor 100 to regulate the supply of electric power to the motor 100.

In an embodiment, the gear reduction mechanism 150 includes a pinion 152 coupled to the motor 100, a bevel gear 154 driven by the pinion 152, a coupling gear 155 coaxial with the bevel gear 154, a drive gear 156 coaxial with the blade 28, and an intermediary gear 158 disposed between the drive gear 156 and the coupling gear 155. In an embodiment, the gear reduction mechanism 150 provides a gear reduction in the range of approximately 5:1 to 10:1 to reduce the output speed of the motor 100 from the range of approximately 18,000 to 30,000 rpm to a blade speed in the range of approximately 2,500 to 4,000 rpm.

Figure 3:
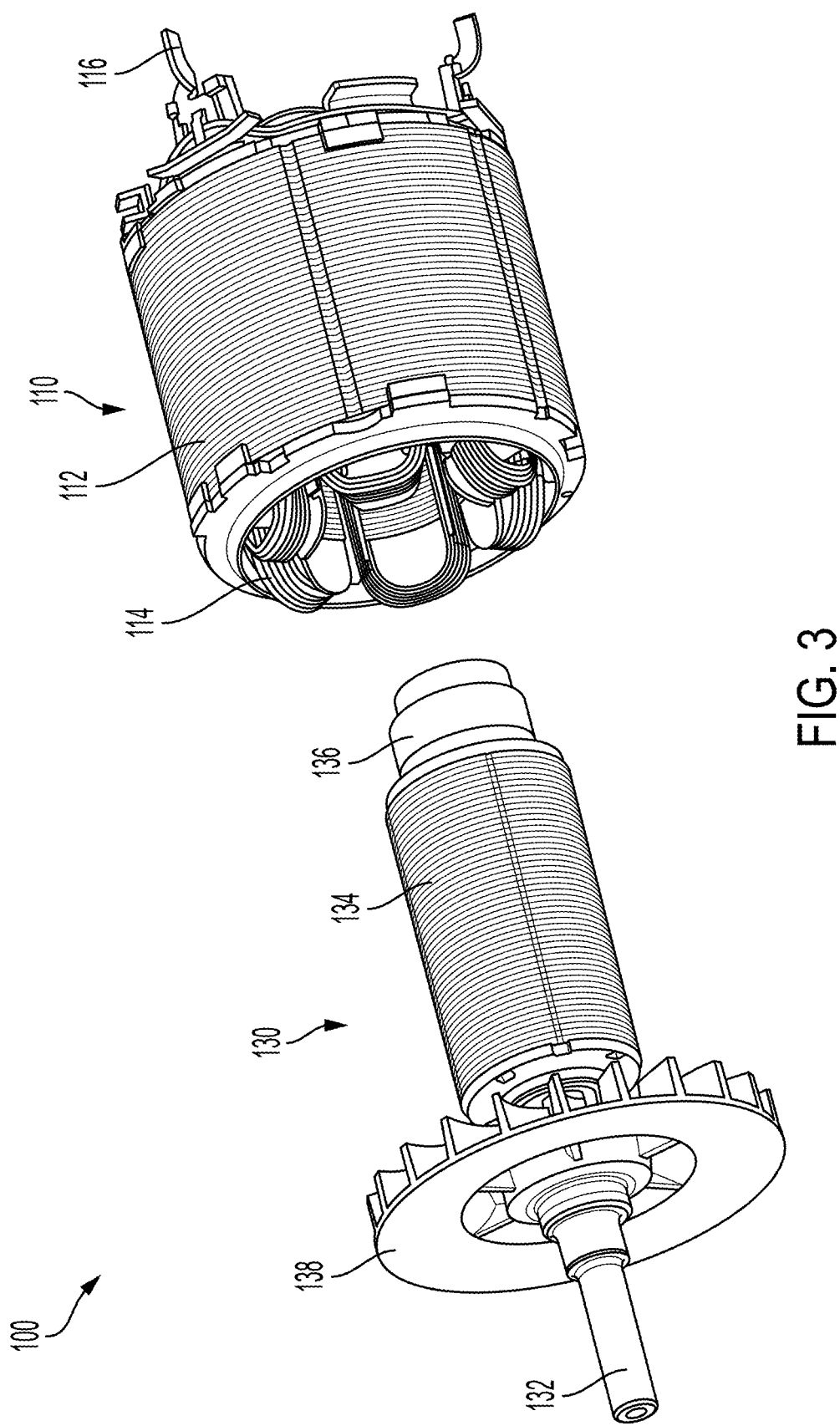
FIG. 3 depicts an exploded view of a brushless DC motor disposed in the power tool, according to an embodiment.

FIG. 3 depicts an exemplary partially-exploded view of the motor 100. The motor 100 is described in great detail in U.S. Pat. No. 10,603,777, contents of which are incorporated herein by reference in entirety. In short, motor 100 includes a stator 110 secured within the motor housing 24 and a rotor 130 rotatably disposed within the stator 110. In an embodiment, stator 110 includes a stator core 112 made of a series of steel laminations secured together and forming a series of inwardly-projecting stator teeth, a series of stator winding 114 wound around the stator teeth in known configurations such as a wye or a delta configuration, a series of terminals 116 that receive electric power from the power and control module 200 via a series of power wires (not shown). In an embodiment, rotor 130 includes a rotor shaft 132, a rotor core 134 that houses a series of permanent magnets (not shown) embedded therein mounted on the shaft 132, one or more bearings 136 that radially support the rotor shaft relative to the stator 110, and a fan 138 provided to cool the stator windings 114.

In an embodiment, the motor 100 is sized and configured to provide a maximum power output of at least approximately 1800 watts, preferably at least approximately 2000 watts, even more preferably at least approximately 2200 watts. As discussed below, this power level is needed to bring the blade 28 to its desired rotational speed in a relatively short amount of time (e.g., between approximately 0.8 to 1.8 seconds, preferably approximately 1.3 seconds). In an embodiment, to accomplish this power level, the motor 100 is provided with a stator diameter of approximately 50 mm to 70 mm, preferably approximately 55 mm to 65 mm; a stator length of approximately 30 mm to 60 mm, preferably approximately 40 mm to 50 mm; and a total motor weight of approximately 600 grams to 1.1 kg, preferably approximately 750 grams to 950 grams.

Table 1 below provides an example of a first exemplary motor provided to drive a 12 inch blade 28 and configured to operate from a 60V max battery pack.

TABLE 1

| Units | Total Weight g | Stack Weight g | Total Size mm | Stack Size mm |
|---|---|---|---|---|
| Stator | 630 | 541.6 | Diameter: 63 Length: 79.5 | Outer Diameter: 61 Inner Diameter: 30 Length: 45.2 |
| Rotor | 304.1 | 182.4 | Diameter: 56 Length: 120.5 | Diameter: 29 Length: 46.9 |

Table 2 below provides an example of a second exemplary motor provided to drive a 10 inch blade 28 and configured to operate from a 20V max battery pack.

TABLE 2

| Units | Total Weight g | Stack Weight g | Total Size mm | Stack Size mm |
|---|---|---|---|---|
| Stator | 422 | 362.4 | Diameter: 63 Length: 64.5 | Outer Diameter: 61 Inner Diameter: 30 Length: 30.1 |
| Rotor | 228.1 | 123.3 | Diameter: 65 Length: 110.5 | Diameter: 29 Length: 31.9 |

Figure 4:
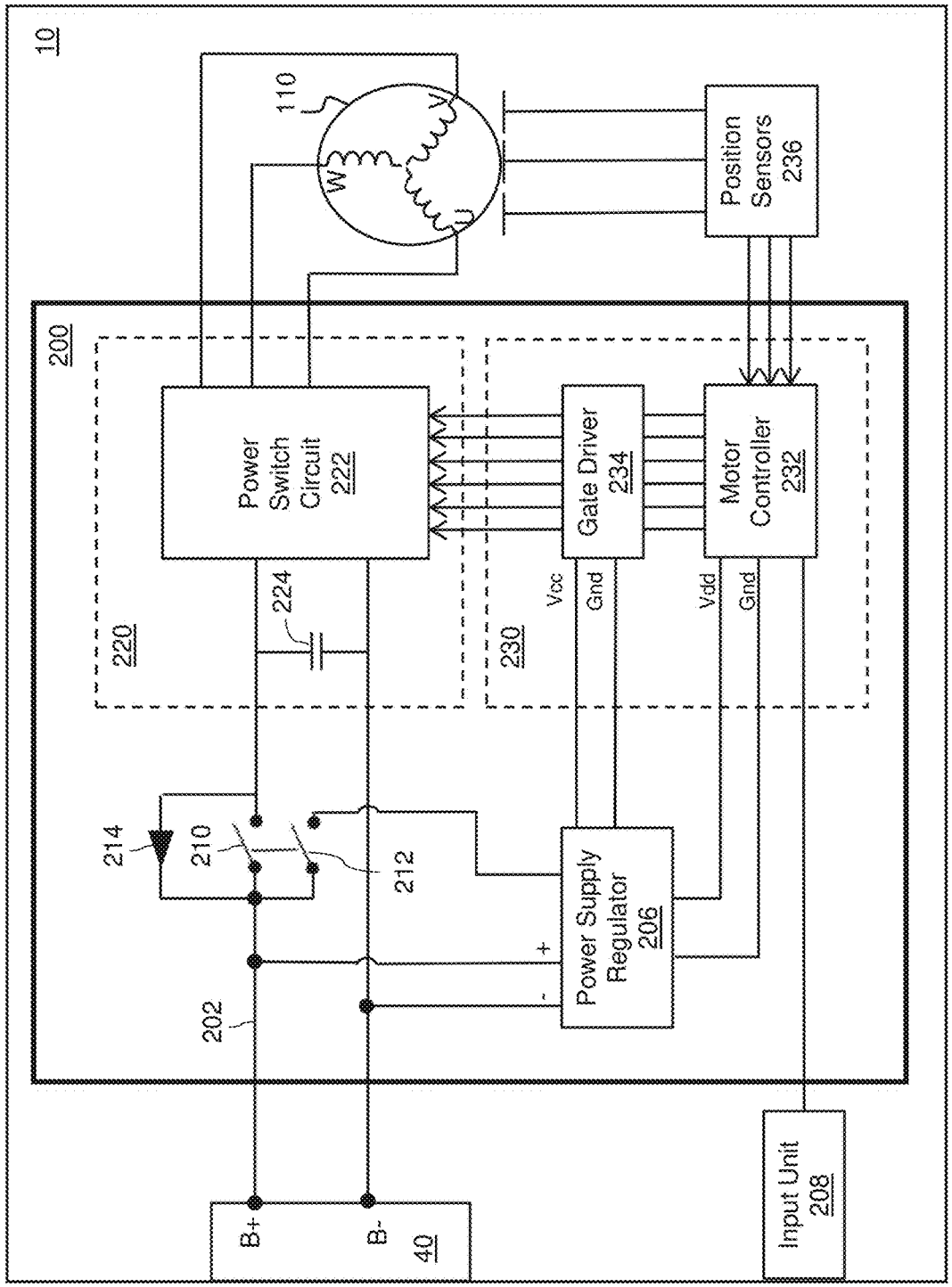
FIG. 4 depicts a block diagram of the power tool components, according to an embodiment.

FIG. 4 depicts an exemplary block circuit diagram of the power tool 10 components, including the motor control and power module 200 disposed between battery receptacle 40 and motor 100, according to an embodiment.

In an embodiment, motor control and power module 200 includes a power unit 220 and a control unit 230.

In an embodiment, power unit 220 may include a power switch circuit 222 that receives electric power on a DC bus line 202 from the B+/B− terminals of the battery receptacle 42 and supplies power to the motor windings to drive the motor 100. In an embodiment, power switch circuit 222 may be a three-phase bridge driver circuit including six controllable semiconductor power switches, e.g. Field Effect Transistors (FETs), Insulated-Gate Metal Transistors (IGBTs), etc. In an embodiment, the power unit 220 further includes a bus capacitor 224 disposed across the DC bus line 202 to absorb residual voltage irregularities.

In an embodiment, FETs may be more suitable for relatively lower power/lower voltage power tool applications (e.g., power tools having operating voltages of approximately 10 to 80 V), and IGBTs may be more suitable for relatively higher voltage/higher voltage power tool applications (e.g., power tools having operating voltages of approximately 100-240 V).

In an embodiment, control unit 230 may include a controller 232 and a gate driver 234. In an embodiment, controller 232 is a programmable device (e.g., a microcontroller, micro-processor, etc.) arranged to control a switching operation of the power devices in power switching circuit 222. In an embodiment, controller 232 handles all aspect of motor control, including, but not limited to, motor drive and commutation control (including controlling the switching operation of the power switching circuit 222 to control motor speed, forward/reverse drive, phase current limit, start-up control, electronic braking, etc.), motor stall detection (e.g., when motor suddenly decelerates or motor current rapidly rises), motor over-voltage detection and shutdown control, motor or module over-temperature detection and shutdown control, electronic clutching, and other control operations related to the motor.

In an embodiment, controller 232 receives rotor rotational position signals from a set of position sensors 236 provided in close proximity to the motor 100 rotor. In an embodiment, position sensors 236 may be Hall sensors. It should be noted, however, that other types of positional sensors may be alternatively utilized. It should also be noted that controller 232 may be configured to calculate or detect rotational positional information relating to the motor 100 rotor without any positional sensors (in what is known in the art as sensorless brushless motor control).

In an embodiment, controller 232 may also receive an ON/OFF signal from an input unit 208. Input unit 208 is coupled to the trigger switch 34 and provides the ON/OFF signal according to the state of the trigger switch 34. In a power tool configured to vary the rotational speed of the motor based on the travel distance of the trigger switch 34, the input unit 208 may provide a variable-speed signal to the controller 232. Based on the rotor rotational position signals from the position sensors 238 and the ON/OFF and/or variable-speed signal from the input unit 208, controller 232 outputs drive signals UH, VH, WH, UL, VL, and WL through the gate driver 234. Gate driver 234 is provided to output the voltage level needed to drive the gates of the semiconductor switches within the power switch circuit 222 in order to control a PWM switching operation of the power switch circuit 222.

In an alternative and/or additional embodiment, a contact switch 210 coupled to the trigger switch 34 is disposed along the current path from the battery receptacle 40 to the power switch circuit 222. An additional contact switch 212 is coupled along the current path from the battery receptacle 40 to the power supply regulator 206. Contact switches 210 and 212 are conjointly driven by the trigger switch 34 to power the power unit 220 and control unit 230 when the trigger switch 34 is actuated by the operator. In an embodiment, a diode 214 is disposed across the contact switch 210 to allow reverse flow of regenerative current into the battery pack 42, as will be discussed later in detail.

In an embodiment, power supply regulator 206 may include one or more voltage regulators to step down the power supply to a voltage level compatible for operating the controller 232 and/or the gate driver 234. In an embodiment, power supply regulator 206 may include a buck converter and/or a linear regulator to reduce the power voltage from the battery pack 42 down to, for example, 15V for powering the gate driver 234, and down to, for example, 3.3V for powering the controller 232.

Figure 5:
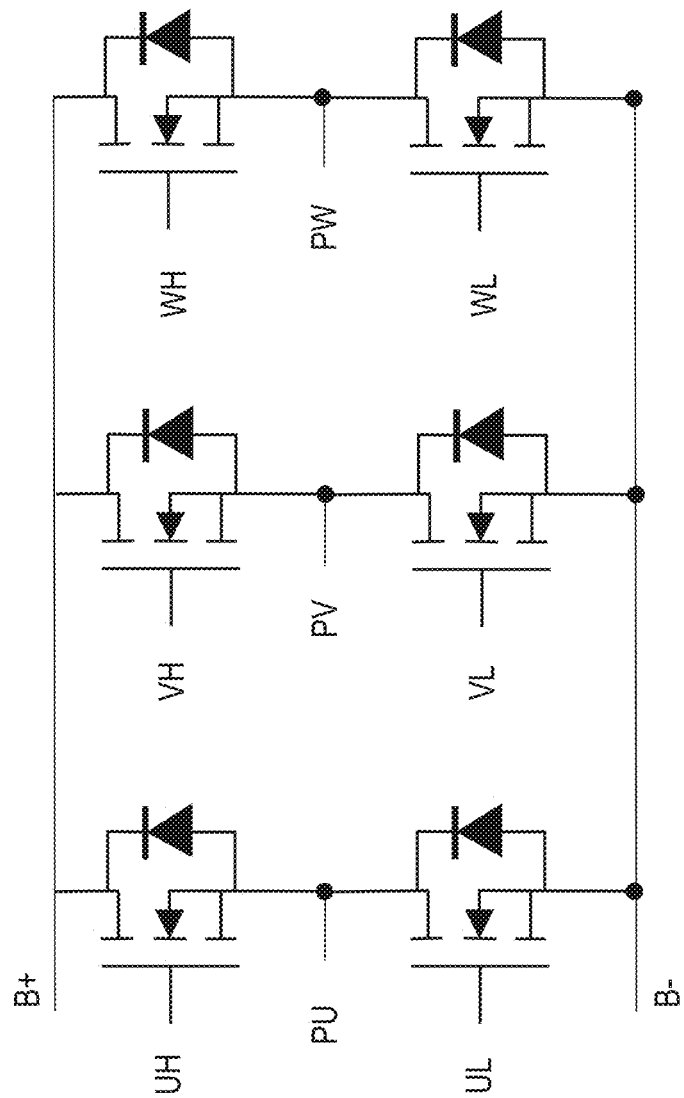
FIG. 5 depicts a circuit block diagram of an inverter circuit of the motor control and power module, according to an embodiment.

FIG. 5 depicts an exemplary power switch circuit 222 having a three-phase inverter bridge circuit, according to an embodiment. As shown herein, the three-phase inverter bridge circuit includes three high-side switches and three low-side switches. The gates of the high-side switches driven via drive signals UH, VH, and WH, and the gates of the low-side switches are driven via drive signals UL, VL, and WL. In an embodiment, the drains of the high-side switches are coupled to the sources of the low-side switches to output power signals PU, PV, and PW for driving the BLDC motor 100. Further, the sources of the high-side switches are coupled to the B+ node and the drains of the low-side switches are coupled to the B− node. By driving the gates of the switches, the motor controller 232 controls the phase of the motor being energized and the amount of electric power being delivered.

Figure 6:
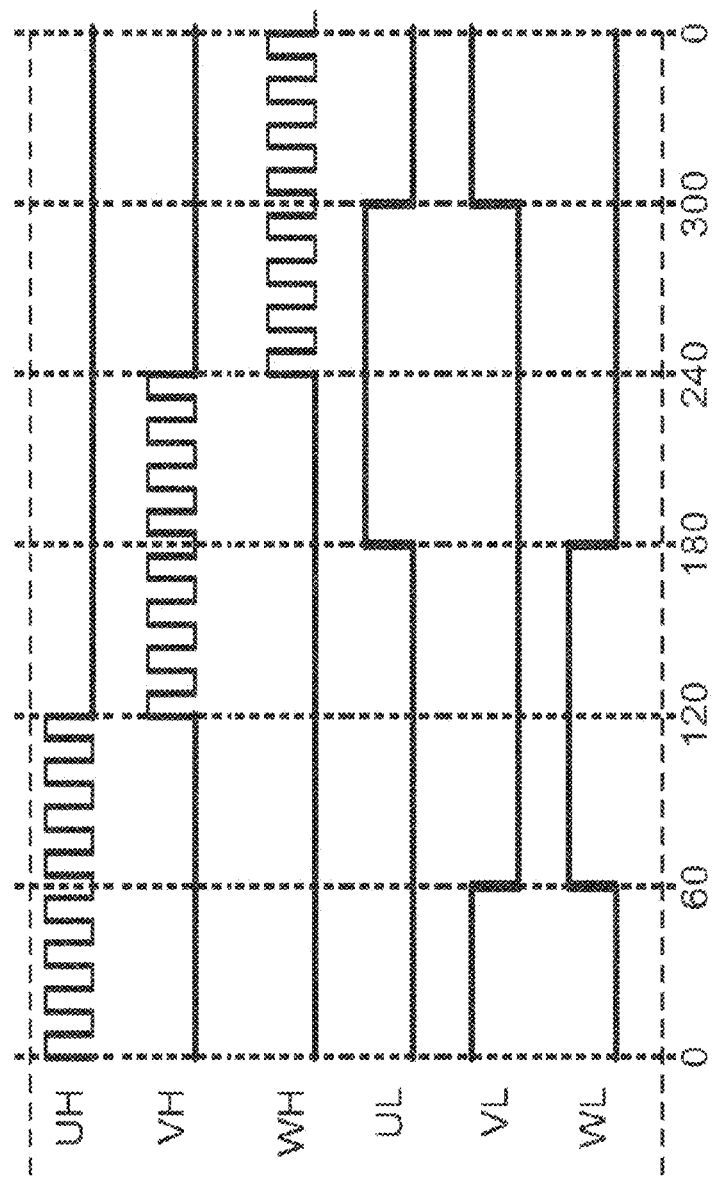
FIG. 6 depicts a waveform diagram of a pulse-width modulation (PWM) drive sequence of the three-phase inventor bridge circuit of FIG. 5 within a full 360 degree conduction cycle, according to an embodiment.

FIG. 6 depicts an exemplary waveform diagram of a pulse-width modulation (PWM) drive sequence of the three-phase inventor bridge circuit of FIG. 5 within a full 360 degree conduction cycle. As shown in this figure, within a full 360° cycle, each of the drive signals associated with the high-side and low-side power switches is activated during a 120° conduction band ("CB"). In this manner, each associated phase of the BLDC motor is energized within a 120° CB by a pulse-width modulated voltage waveform that is controlled by the control unit 230 as a function of the desired motor rotational speed. For each phase, the high-side switch is pulse-width modulated by the control unit 230 within a 120° CB. During the CB of the high-side switch, the corresponding low-side switch is kept low, but one of the other low-side switches is kept high to provide a current path between the power supply and the motor windings. The motor controller 232 controls the amount of voltage provided to the motor, and thus the speed of the motor, via PWM control of the high-side switches.

It is noted that while the waveform diagram of FIG. 6 depicts one exemplary PWM technique at 120° CB, other PWM methods may also be utilized. One such example is PWM control with synchronous rectification, in which the high-side and low-side switch drive signals (e.g., UH and UL) of each phase are PWM-controlled with synchronous rectification within the same 120° CB.

There are various events that may prompt the controller 232 to stop motor commutation. Examples of such events include, but are not limited to, trigger-release by the user, a battery over-current condition (i.e., when the controller senses or receives a signal indicative of the current being drawn from the battery exceeds a predetermined threshold), a battery under-voltage condition, a battery over-temperature condition, motor 100 or power module 222 over-temperature condition, etc. Upon detection of such an event, the controller 232 may stop commutation of the motor 100 and allow the motor 100 to coast down by deactivating all the high-side and low-side power switches of power switch circuit 222. In this scenario, the induced current resulting from the back-EMF (electro-magnetic force) voltage of the motor 100 is conducted backwards through the anti-parallel diodes of the power switches and the motor 100 slowly slows down as a result of the internal friction between the motor components until it comes to a stop. It is noted that since BLDC motors do not benefit from the friction between brushes and the commutator present in conventional brushed motors during coasting, the coasting period may take longer than desired.

Figure 7:
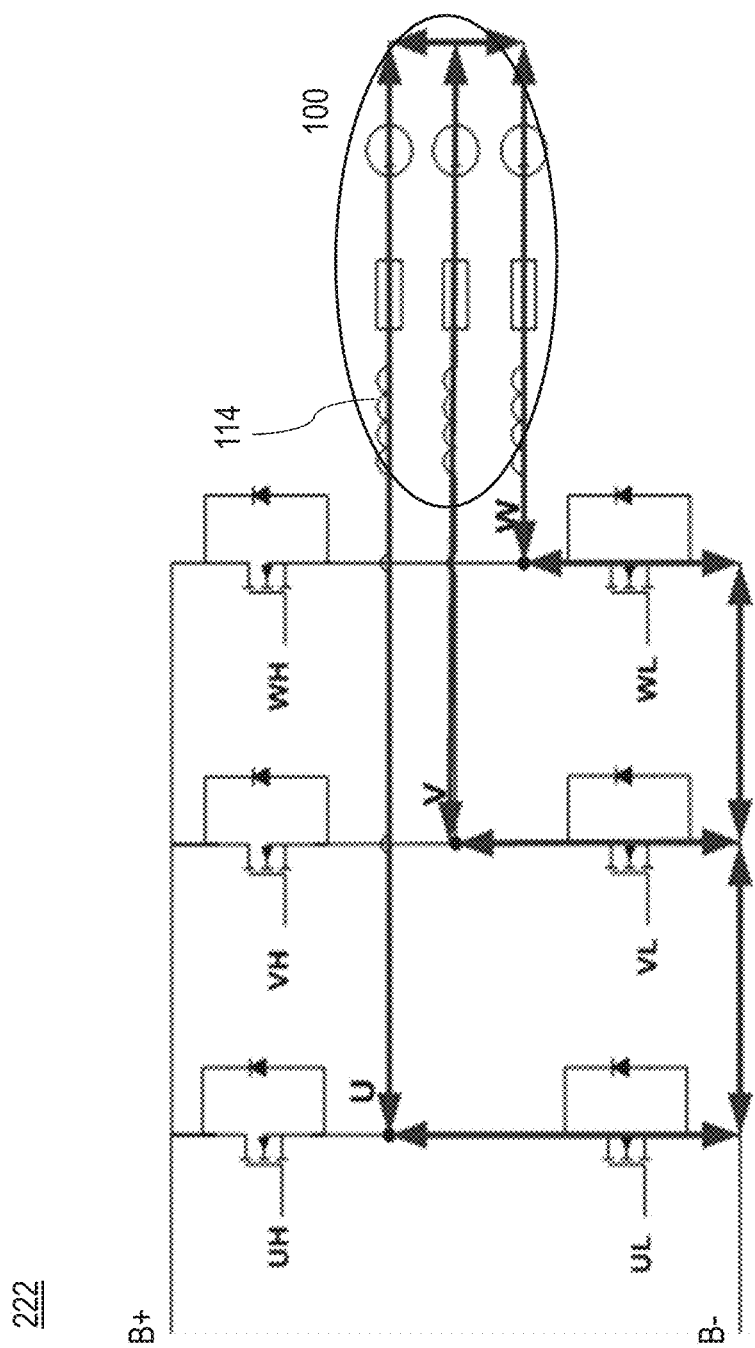
FIG. 7 depicts a circuit block diagram of the inverter circuit during execution of electronic braking, according to an embodiment.

Alternatively, as shown in the circuit diagram of FIG. 7, according to an embodiment, the controller 232 may electronically brake the motor 100 by short-circuiting the high-side or low-side power switches of the power switch circuit 222. In an embodiment, controller 232 may turn ON the three high-side power switches simultaneously while the three low-side power switches are turned off. Alternatively, controller 232 may turn ON the three low-side power switches simultaneously while the three high-side power switches are turned off. Either of these techniques allows the back-EMF current of the motor 100 to circulate through the stator windings 114, creating a force traverse to the rotation of the motor that acts to stop the rotation of the motor 100. Specifically, as the rotor continues to spin inside the stator, the change in magnetic flux in the stator coils resulting from the rotation of the rotor lamination stack results in a back-EMF voltage developing on the stator coils. Short-circuiting the stator windings 114 completes the circuit, allowing the back-EMF induced current to flow through the windings and dissipate, thus generating a braking force to stop the rotation of the rotor.

Figure 8:
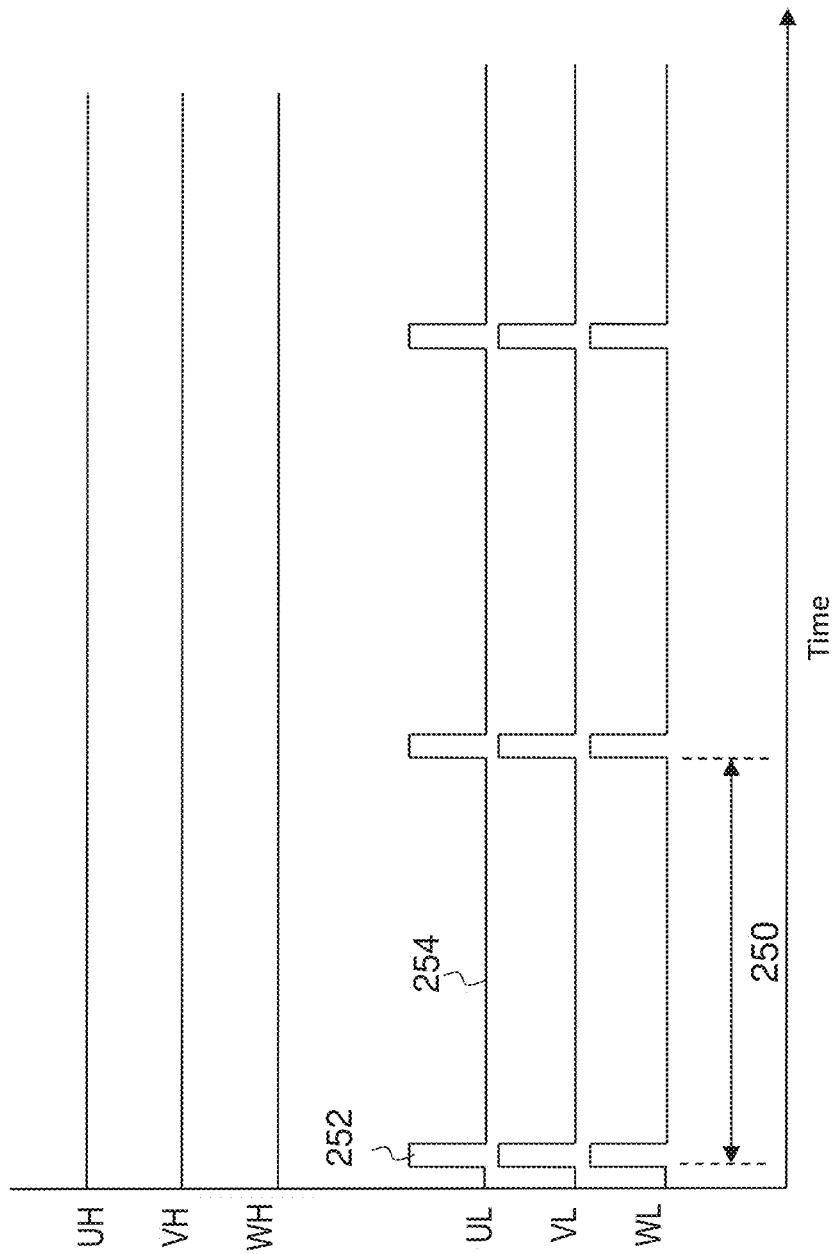
FIG. 8 depicts a waveform diagram of an exemplary braking scheme, according to an embodiment.

FIG. 8 depicts a waveform diagram of an exemplary braking scheme, according to an embodiment. In this embodiment, within each braking cycle 250, the controller 232 simultaneously activate the low-side switches to electronically brake the motor during a braking period 252, followed by a coasting period 254 within which the controller 232 turns off all switches to allow the built-up induced current of the motor to flow through the anti-parallel diodes of the inverter circuit 222 (e.g., through anti-parallel diodes of the VL and UH switches in one phase). This braking scheme, herein referred to as soft-braking, allows the controller 232 to control the braking force, and therefore the braking time of the motor, by controlling the duty cycle of the braking period 252 as a percentage of the total braking cycle 250. For more detailed descriptions of exemplary braking methods, reference is made to U.S. Pat. Nos. 9,246,421 and 11,047,528, both of which are incorporated herein by reference in their entireties.

It is noted that while in this example all three high-side or low-side switches are turned on simultaneously during a braking cycle, it is possible to brake the motor by turning on only two of the high-side or two of the low-side switches simultaneous. While this technique is not as efficient and takes a longer time to execute braking, it may be suitable in some systems, and is within the scope of this disclosure.

In an embodiment of the invention, a regenerative braking scheme is implemented to allow the induced current of the motor to flow back into the battery pack 42 and recharge the battery pack 42 during each coasting period 254. As described herein, the regenerative braking scheme of the invention takes advantage of the rather large inertia of the saw blade and other rotating components of the saw 10 to generate high levels of induced motor current during the braking cycle of the motor, and direct that current to the recharge the battery pack 42 after every trigger release event to provide a significant increase in the number of cuts by the miter saw 10 per full discharge cycle of the battery pack 42.

Table 3 below provides the mass, inertia, and no-load stored energy in various rotating components of a first example saw 10 using the first exemplary motor of Table 1 (i.e., a 45 mm stator stack length) and a large saw blade (in this example, standard 12 inch saw blade with a diameter of approximately 304.8 mm±4 mm; a plate thickness of 1.75 mm±0.07 mm; a kerf thickness of 2.41 mm±0.22 mm; 60 number of teeth; and an arbor diameter of approximately 25.4 mm), according to an embodiment.

TABLE 3

| Units | Mass<br>g | Inertia<br>$10^{-6}$ kg · m$^2$ | No-Load Stored Energy<br>J |
| --- | --- | --- | --- |
| Rotor | 304.1 | 32.5 | 83.8 |
| Gear system | 579.5 | 132 | 15.4 |
| Blade | 1,110.5 | 10,564.4 | 836.5 |
| Total | 1,994.1 | 10,728.9 | 935.7 |

Table 4 below provides the mass, inertia, and no-load stored energy in various rotating components of a second example saw 10 using the second exemplary motor of Table 2 (i.e., a 30 mm stator stack length) and a medium saw blade (in this example, a standard 10 inch saw blade with a diameter of approximately 254 mm±3 mm; a plate thickness of 1.75 mm±0.04 mm; a kerf thickness of 2.41 mm±0.22 mm; 40 number of teeth; and an arbor diameter of approximately 15.88 mm), according to an embodiment.

TABLE 4

| Units | Mass g | Inertia $10^{-6}$ kg·m² | No-Load Stored Energy J |
|---|---|---|---|
| Rotor | 228.1 | 24.6 | 61.8 |
| Gear system | 569.4 | 68.7 | 15.6 |
| Blade | 768.8 | 4,993.7 | 633.7 |
| Total | 1,566.3 | 5,087 | 711.1 |

Table 5 below provides the mass, inertia, and no-load stored energy in various rotating components of a third example saw 10 using the second exemplary motor of Table 2 (i.e., a 30 mm stator stack length) and a small saw blade (in this example, a standard 7-%4 inch saw blade with a diameter of approximately 184 mm±3 mm; a plate thickness of 0.99 mm±0.07 mm; a kerf thickness of 2.0 mm±0.3 mm; 40 number of teeth; and an arbor diameter of approximately 15.88 mm), according to an embodiment.

TABLE 5

| Units | Mass g | Inertia $10^{-6}$ kg·m² | No-Load Stored Energy J |
|---|---|---|---|
| Rotor | 228.1 | 24.6 | 64.1 |
| Gear system | 565.9 | 136.9 | 16.4 |
| Blade | 251.9 | 718.9 | 142.3 |
| Total | 1,045.9 | 880.4 | 222.8 |

In an embodiment, for these examples, due to the higher mass of the exemplary large saw blade, the first example saw 10 operating the exemplary large saw blade is provided with a larger length motor to allow the motor to deliver a greater power output needed to ramp up the rotational speed of the motor to the desired level at start-up.

In an embodiment, the exemplary large saw blade includes more than approximately twice the inertia of the exemplary medium saw blade and close to 15 times the inertia of the exemplary small saw blade. Due to high mass and inertia of the saw blade, the no-load stored energy of the saw blade, which is the energy of the saw blade at full-speed prior to initiation of a cut, is significantly higher in the exemplary large saw blade than the exemplary medium saw blade, which in turn is significantly greater than exemplary small saw blade. In an embodiment, when running at output blade speed of approximately 2,500 rpm to 4,000 rpm, preferably approximately 3,100 rpm to 3,500 rpm, the no-load stored energy of the exemplary large saw blade is at least approximately 740 joules, preferably at least approximately 785 joules, preferably at least approximately 820 joules. At the same speed range, the no-load stored energy of the exemplary medium saw blade is at least approximately 460 joules, preferably at least approximately 535 joules, preferably at least approximately 590 joules. By comparison, the no-load stored energy of the exemplary small saw blade is below 200 joules, and in the above example merely 142.2 joules.

In an embodiment, controller 232 is configured to take advantage of the large amount of energy stored in the saw blade to provide significant regenerative energy to the battery pack 42 after the completion of every cut. Specifically, during the braking period 252 of each braking cycle 250 (FIG. 8), the stator windings convert the combined energy of the saw blade, the gear system, and the rotor, to electrical energy. In an embodiment, during the ensuring coasting period 254, this energy is released back to the DC bus 202. The voltage of the stator winding is a function of L×Di/Dt, where L is the inductance of the motor windings. Therefore, by controlling Di/Dt, controller 232 is able to release a higher voltage than the DC bus voltage from the stator windings, causing a reverse current flow from back into the battery pack 42. The large regenerative energy directed to the battery pack 42 after each cut, combined with the short duration of each cutting operation, allows the controller 232 to significantly increase the number of cuts that is obtainable from a full discharge cycle of the battery pack 42, i.e., from the fully charged state of the battery pack until the battery pack reaches a minimum discharge voltage cutoff threshold.

Figure 9:
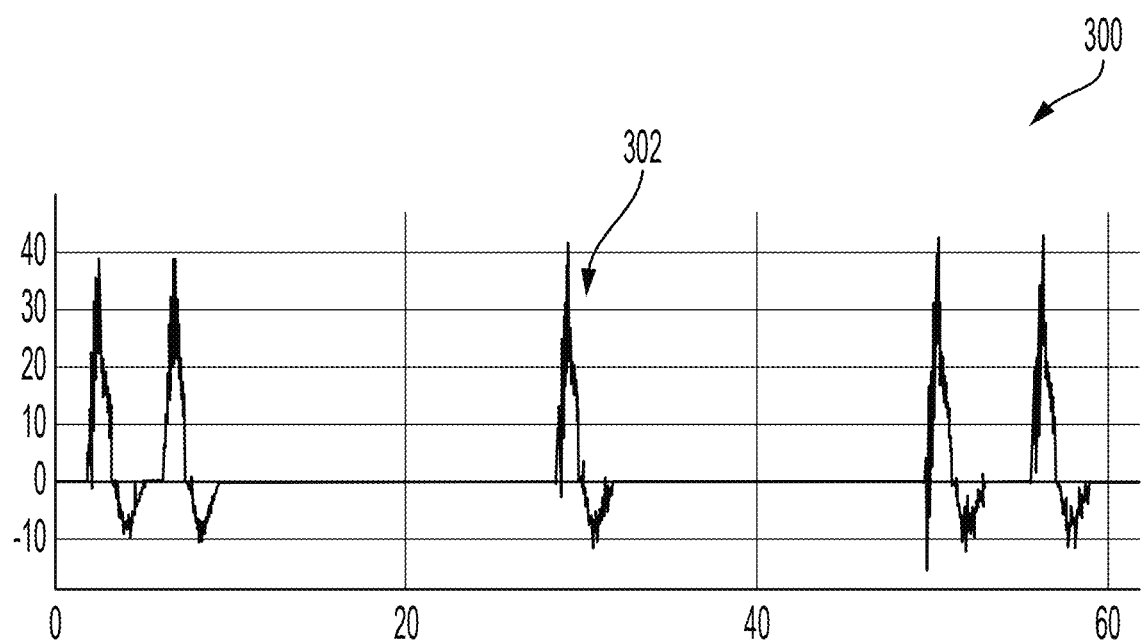
FIG. 9 depicts a current waveform diagram associated with a series of cutting operations of the power tool, according to an example embodiment.

FIG. 9 depicts a current waveform diagram 300 associated with a series of cutting operations 302 of the miter saw 10 as measured on the DC bus line 202 over a 60 second time span, according to an example. In this example, each cutting operation 302 includes a cutting portion where the current spikes to over 30 amps, followed by a regenerative portion where up to approximately 10 amps of current flows back into the battery pack 42.

Figure 10:
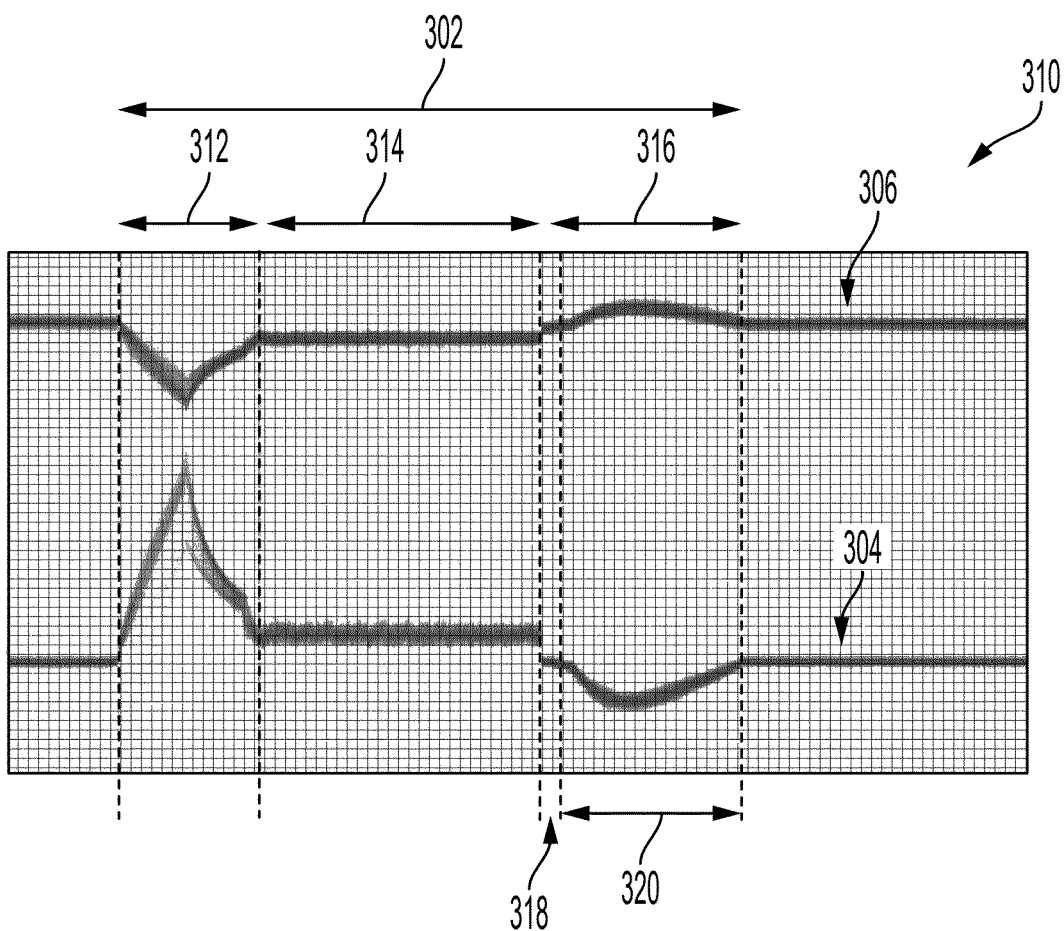
FIG. 10 depicts a combined voltage and current diagram for a single cutting operation, according to an embodiment.

FIG. 10 depicts a combined voltage and current diagram 310 for a single cutting operation 302, according to an embodiment. In this example, current waveform 304 and DC bus voltage waveform 306 are provided.

In an embodiment, the cutting operation 302 includes a start-up period 312, a cutting period 314, and a ramp-down period 316.

In an embodiment, during the start-up period 312, the current ramps up rapidly, and the DC bus voltage falls correspondingly, to allow the motor to bring the rotational speed of the saw blade to its desired target speed (e.g., approximately 2,500 rpm to 4,000 rpm, preferably approximately 3,100 rpm to 3,500 rpm). In this example, during the start-up period 312, the current waveform 304 reaches a peak of approximately 48 amps and an average current of approximately 25 amps. The current waveform 304 falls to approximately 4 amps to 8 amps at the end of the start-up period 312.

In an embodiment, during the cutting period 314, the change in current and voltage is relatively minor in comparison to the change in voltage and current at start-up. This is because the energy needed to perform the cutting operation for wood material is substantially absorbed from the inertia of the saw blade.

In an embodiment, the ramp-down period 316 includes a coasting period 318, which is approximately 0.1 to 0.3 seconds, preferably approximately 0.2 seconds, in this example, followed by a regenerative period 320. During the regenerative period 320, the controller applies a series of braking cycles 250 (see FIG. 8), including braking periods 252 and coasting periods 254, at approximately 20 kH frequency. The duty cycle of the braking period 252 as a proportion of the braking cycle 250 is controlled by the controller 232 and is ramped up from 0% gradually up to 100% during the regenerative period 320. Furthermore, during the regenerative period 320, the current waveform 304 falls to a minimum current of approximately −12 amps and an average current of approximately −9 amps, causing a reverse flow of current into the battery pack 42 to charge the battery pack within this period. In an embodiment, the duration of the regenerative period 320 is approximately 0.9 to 2.8 seconds, preferably approximately 1.2 to 2.5 seconds, more preferably approximately 1.5 seconds to 2.2 seconds, even more preferably approximately 1.8 seconds to 1.9 seconds. By controlling the ramp-up of the braking cycle 250 duty cycle and the duration of the regenerative period 320, the controller provides an optimal amount of regenerative braking current for recharging the battery pack 42.

In an embodiment, no coasting period 318 is provided, and the ramp-down period 316 starts with the regenerative period 320.

In an embodiment, although the cutting period 314 is user-dependent, it is expected to take up approximately no more than 2 second during normal usage by an ordinary operator, and therefore approximately no more than half the entire cutting operation 302. In an embodiment, the ramp-down period 316 is approximately 1.3 to 1.8 times longer than the start-up period 312 and takes up approximately 25% to 36% of the entire cutting operation 302. This ensures that a significant portion of each cutting operation is dedicated to recharging the battery pack.

The tables below include testing data on the saw 10 using the first exemplary motor of Table 1 (i.e., a 45 mm stator stack length) and the 12 inch saw blade, when used with three different-capacity battery packs and three different types of workpieces, according to an embodiment.

The battery packs utilized in these tests are 6 amp-hour (Ah), 9 Ah, and 12 Ah 60-volt max battery packs having a nominal voltage of approximately 54 volts. Table 6 below summarizes the energy output of each battery pack.

TABLE 6

| Battery Pack | Capacity | Watts-Hours | Energy Output (Joules) |
|---|---|---|---|
| A | 6 Ah | 104 | 375,599 |
| B | 9 Ah | 163 | 587,155 |
| C | 12 Ah | 205 | 737,708 |

Table 7 below summarizes the cut energy drawn from each battery pack for cutting a 3¼ MDF (Medium Density Fiberboard) baseboard workpiece having a thickness of approximately ¾ inch (i.e., approximately 19 mm±1 mm) and a width of approximately 3 inches (i.e., approximately 76 mm±2 mm), and the regenerative energy that recharges each battery pack following each cutting operation, according to an embodiment.

TABLE 7

|  | Pack A (Joules) | Pack B (Joules) | Pack C (Joules) | Average | Std Dev | σ/μ |
|---|---|---|---|---|---|---|
| Cut Energy (Trigger ON-Trigger OFF) | 1414.44 | 1423.80 | 1425.96 | 1421 | 6.12 | 0.4% |
| Regenerative Energy | −515.52 | −524.16 | −526.32 | −522 | 5.71 | 1.1% |

Accordingly, in an embodiment, utilizing the regenerative braking scheme of the invention, at least approximately 33%, preferably at least approximately 35%, of the energy derived from the battery back is directed back into the battery pack after each cutting operation when using a 3¼ MDF baseboard. This significantly increases the number of cuts that an operator can obtain from a signal battery pack discharge cycle.

Larger types of woodworking material, such as industry-standard 2×4 SPF (Spruce Pine Fir) lumber having a cross-sectional size of approximately 1.5 in ×3.5 in (i.e., approximately 38 mm×89 mm±2 mm), and industry-standard 4×4 PT (Pressure-Treated) lumber having a cross-sectional size of approximately 3.5 in ×3.5 in (i.e., approximately 89 mm×89 mm±2 mm), also see significant increases in the number of cuts per battery pack discharge cycle. It should be noted, however, that since larger amounts of kinetic energy of the saw blade is needed to perform cutting operations of the 2×4 SPF and 4×4 PT lumber, the number of cuts per battery pack discharge cycle are relatively smaller. Specifically, during the cutting operation of each workpiece, there is some speed drop on the saw blade. This speed drop is proportional to the size of the workpiece. However, regardless of the size of the workpiece, the workload on the motor quickly decreases at the conclusion of the cutting operation, and the blade speed returns to its no-load speed quickly before the operator releases the trigger. Therefore, the total kinetic energy of the saw blade, and consequently the energy available for regenerative recharging of the battery pack, will be the same after each cutting operation irrespective of the size of the workpiece.

Tables 8-10 below summarize the number of cuts of the three types of material discussed above with and without the regenerative braking scheme of the invention, for each battery pack, according to an embodiment.

TABLE 8

| Battery Pack A (6 AH) | 3¼" MDF | 2 × 4 SPF | 4 × 4 PT |
|---|---|---|---|
| Calculated Cuts per charge without Regenerated Energy | 273 | 211 | 141 |
| Calculated Cuts per amp-hour without Regenerated Energy | 46 | 35 | 23.5 |
| Calculated Cuts per charge with Regenerated Energy | 431 | 269 | 164 |
| Calculated Cuts per amp-hour with Regenerated Energy | 72 | 45 | 27.3 |
| Difference in the calculated number of cuts per charge | 158 | 58 | 23 |
| Difference in the calculated number of cuts per amp-hour | 26 | 10 | 3.8 |
| Improvement in the number of cuts per charge | 57.8% | 27.5% | 16.3% |

TABLE 9

| Battery Pack B (9 AH) | 3¼" MDF | 2 × 4 SPF | 4 × 4 PT |
|---|---|---|---|
| Calculated Cuts per charge without Regenerated Energy | 426 | 330 | 220 |
| Calculated Cuts per amp-hour without Regenerated Energy | 47 | 37 | 24.5 |
| Calculated Cuts per charge with Regenerated Energy | 675 | 421 | 257 |
| Calculated Cuts per amp-hour with Regenerated Energy | 75 | 47 | 28.5 |
| Difference in the calculated number of cuts per charge | 248 | 91 | 36 |
| Difference in the calculated number of cuts per amp-hour | 28 | 10 | 4 |
| Improvement in the number of cuts per charge | 58.2% | 27.6% | 16.4% |

TABLE 10

| Battery Pack C (12 AH) | 3¼" MDF | 2 × 4 SPF | 4 × 4 PT |
|---|---|---|---|
| Calculated Cuts per charge without Regenerated Energy | 535 | 414 | 277 |
| Calculated Cuts per amp-hour without Regenerated Energy | 45 | 35 | 23.1 |
| Calculated Cuts per charge with Regenerated Energy | 847 | 529 | 323 |
| Calculated Cuts per amp-hour with Regenerated Energy | 70 | 44 | 26.9 |
| Difference in the calculated number of cuts per charge | 312 | 115 | 46 |
| Difference in the calculated number of cuts per amp-hour | 26 | 9.6 | 3.8 |
| Improvement in the number of cuts per charge | 58.3% | 27.8% | 16.6% |

As shown in these tables, the regenerative braking of the invention improves the number of cuts for a full battery charge by approximately 16% when using a 4×4 PT workpiece lumber having a cross-sectional size of approximately 89 mm×89 mm±2 mm, by approximately 28% when using a 2×4 SPF lumber workpiece having a cross-sectional size of approximately 38 mm×89 mm±2 mm, and by approximately 58% when using a 3¼ MDF workpiece having a thickness of approximately 19 mm±1 mm and a width of approximately 76 mm±2 mm.

Accordingly, in an embodiment of the invention, a cordless saw is provided including an electric motor and a standard saw blade having a diameter of approximately 304.8 mm±4 mm that, when operating on a 4×4 PT lumber workpiece having a cross-sectional size of approximately 89 mm×89 mm±2 mm, is capable of performing at least 25.3 number of cuts per amp.hour of battery capacity, preferably at least 25.6 number of cuts per amp.hour of battery capacity, more preferably at least 25.9 number of cuts per amp.hour of battery capacity, more preferably at least 26.2 number of cuts per amp.hour of battery capacity, more preferably at least 26.5 number of cuts per amp.hour of battery capacity, and even more preferably at least 26.8 number of cuts per amp.hour of battery capacity.

Accordingly, in an embodiment of the invention, a cordless saw is provided including an electric motor and a standard saw blade having a diameter of approximately 304.8 mm±4 mm that, when operating on a 2×4 SPF lumber workpiece having a cross-sectional size of approximately 38 mm×89 mm±2 mm, is capable of performing at least 40 number of cuts per amp.hour of battery capacity, preferably at least 41 number of cuts per amp.hour of battery capacity, more preferably at least 42 number of cuts per amp.hour of battery capacity, more preferably at least 43 number of cuts per amp.hour of battery capacity, and even more preferably at least 44 number of cuts per amp.hour of battery capacity.

Accordingly, in an embodiment of the invention, a cordless saw is provided including an electric motor and a standard saw blade having a diameter of approximately 304.8 mm±4 mm that, when operating on a 3¼ MDF baseboard workpiece having a thickness of approximately 19 mm±1 mm and a width of approximately 76 mm±2 mm, is capable of performing at least 52 number of cuts per amp.hour of battery capacity, preferably at least 55 number of cuts per amp.hour of battery capacity, more preferably at least 58 number of cuts per amp.hour of battery capacity, more preferably at least 61 number of cuts per amp.hour of battery capacity, more preferably at least 64 number of cuts per amp.hour of battery capacity, more preferably at least 67 number of cuts per amp.hour of battery capacity, and even more preferably at least 70 number of cuts per amp.hour of battery capacity.

Some of the techniques described herein may be implemented by one or more computer programs executed by one or more processors residing, for example on a power tool. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A cordless saw for repeated cutting of a workpiece, comprising:
a saw housing;
a battery connection port formed in the saw housing for receiving a removable battery pack;
an electric motor disposed within the housing and configured to rotatably drive an output shaft, wherein the output shaft is coupleable to a saw blade to perform a plurality of cutting operations on the workpiece;
a trigger switch operable by an operator for selective electronic connection or disconnection of a supply of electric power from the battery pack to the electric motor;
a power switch circuit disposed between the battery connection port and the electric motor; and
a control unit configured to regulate a switching operation of the power switch circuit for each of the plurality of cutting operations to supply electric power from the battery pack to the motor while the trigger switch is depressed and apply an regenerative braking period after the trigger switch is released, wherein during the regenerative braking period, the control unit applies a plurality of electronic braking periods to electric motor to slow down the rotation of the electric motor and a plurality of regenerative charging periods during which a regenerative energy induced by the electric motor charges the battery pack, wherein the regenerative energy is on average at least 33% of the average energy derived from the battery pack during the plurality of cutting operations,
wherein each of the plurality of cutting operations includes, prior to the regenerative braking period, a start-up period during which an electric current supplied to the motor ramps up to bring an output speed of the motor to a target speed, followed by a cutting period during which the saw blade engages the workpiece, wherein the regenerative braking period is longer than the start-up period.

2. The cordless saw of claim 1, wherein, when the saw blade has a diameter of 304.8 mm+4 mm, the saw is capable of performing, per full discharge cycle of the battery pack, at least 25.3 number of cuts per amp.hour of battery capacity when operating on a Pressure-Treated (PT) lumber workpiece having a cross-sectional size of approximately 89 mm×89 mm±2 mm, at least 40 number of cuts per amp.hour of battery capacity when operating on a Spruce Pine Fir (SPF) lumber workpiece having a cross-sectional size of approximately 38 mm×89 mm±2 mm, or at least 52 number of cuts per amp.hour of battery capacity when operating on a Medium Density Fiberboard (MDF) workpiece having a thickness of approximately 19 mm+1 mm and a width of approximately 76 mm±2 mm.

3. The cordless saw of claim 1, wherein, when the saw blade has a diameter of 304.8 mm±4 mm and the battery pack has a maximum battery voltage of 20V and a capacity of approximately 6 amp.hours, the saw is capable of performing, per full discharge cycle of the battery pack, at least 152 number of cuts when operating on a Pressure-Treated (PT) lumber workpiece having a cross-sectional size of approximately 89 mm×89 mm±2 mm, at least 240 number of cuts when operating on a Spruce Pine Fir (SPF) lumber workpiece having a cross-sectional size of approximately 38 mm×89 mm±2 mm, or at least 312 number of cuts when operating on a Medium Density Fiberboard (MDF) workpiece having a thickness of approximately 19 mm±1 mm and a width of approximately 76 mm±2 mm.

4. The cordless saw of claim 1, wherein, when the saw blade has a diameter of 304.8 mm±4 mm and the battery pack has a maximum battery voltage of 20V and a capacity of approximately 9 amp.hours, the saw is capable of performing, per full discharge cycle of the battery pack, at least 228 number of cuts when operating on a Pressure-Treated (PT) lumber workpiece having a cross-sectional size of approximately 89 mm×89 mm=2 mm, at least 360 number of cuts when operating on a Spruce Pine Fir (SPF) lumber workpiece having a cross-sectional size of approximately 38 mm×89 mm±2 mm, or at least 468 number of cuts when operating on a Medium Density Fiberboard (MDF) workpiece having a thickness of approximately 19 mm±1 mm and a width of approximately 76 mm±2 mm.

5. The cordless saw of claim 1, wherein the regenerative braking period is 1.3 to 1.8 times longer than the start-up period.

6. The cordless saw of claim 1, wherein the regenerative braking period is approximately 25% to 36% of the cutting operation.

7. A cordless saw for repeated cutting of a workpiece, comprising:
a saw housing;
a battery connection port formed in the saw housing for receiving a removable battery pack;
an electric motor disposed within the housing and configured to rotatably drive an output shaft, wherein the output shaft is coupleable to a saw blade to perform a plurality of cutting operations on the workpiece;
a trigger switch operable by an operator for selective electronic connection or disconnection of a supply of electric power from the battery pack to the electric motor;
a power switch circuit disposed between the battery connection port and the electric motor; and
a control unit configured to regulate a switching operation of the power switch circuit for each of the plurality of cutting operations to supply electric power from the battery pack to the motor while the trigger switch is depressed and apply an regenerative braking period after the trigger switch is released, wherein during the regenerative braking period, the control unit applies a plurality of electronic braking periods to electric motor to slow down the rotation of the electric motor and a plurality of regenerative charging periods during which a regenerative energy induced by the electric motor charges the battery pack, wherein each of the plurality of cutting operations includes, prior to the regenerative braking period, a start-up period during which an electric current supplied to the motor ramps up to bring an output speed of the motor to a target speed, followed by a cutting period during which the saw blade engages the workpiece, wherein the regenerative braking period is longer than the start-up period, and wherein, when the saw blade has a diameter of 304.8 mm±4 mm, the saw is capable of performing, per full discharge cycle of the battery pack, at least 25.3 number of cuts per amp.hour of battery capacity when operating on a Pressure-Treated (PT) lumber workpiece having a cross-sectional size of approximately 89 mm×89 mm±2 mm, at least 40 number of cuts per amp.hour of battery capacity when operating on a Spruce Pine Fir (SPF) lumber workpiece having a cross-sectional size of approximately 38 mm×89 mm±2 mm, or at least 52 number of cuts per amp.hour of battery capacity when operating on a 3¼ Medium Density Fiberboard (MDF) workpiece having a thickness of approximately 19 mm±1 mm and a width of approximately 76 mm±2 mm.

8. The cordless saw of claim 7, wherein the regenerative energy is on average at least 33% of the average energy derived from the battery pack during the plurality of cutting operations.

9. The cordless saw of claim 7, wherein the regenerative braking period is approximately 1.3 to 1.8 times longer than the start-up period.

10. The cordless saw of claim 7, wherein the regenerative braking period is approximately 25% to 36% of the cutting operation.

11. A system for repeated cutting of a workpiece, or workpieces, including a cordless battery-powered saw, wherein the saw comprises:
a saw housing;
a battery connection port formed in the saw housing for receiving a battery pack to be coupled to the saw;
an electric motor, mounted in the housing and for selective electrical connection with the battery pack is inserted into the port;
a saw blade rotatably driven by the motor;
a trigger switch operably by an operator for selective electronic connection or disconnection to the motor of the battery pack inserted into the port to the motor; and
a regenerative braking means configured to control the operation of the motor,
wherein the motor, when electrically connected to the battery via connection of the switch, provides a rotating output, which rotating output is transferred to the saw blade for performing a workpiece cutting operation, wherein, on disconnection of the motor from the battery pack via the switch, the regenerative braking means electronically brakes the motor to stop the rotating output and provides a current path for the electrical charge generated from an angular momentum of the rotating output to be applied to the battery pack, wherein the saw is configured to perform a series of cutting operations, each including a start-up period, a cutting period, and a ramp-down period, wherein the regenerative braking means is applied during the ramp-down period, and wherein the ramp-down period is controlled to include a duration that is longer than a duration of the start-up period, and wherein the electrical charge applied to the battery by the regenerative braking means increases the number of repeated cuttings the saw is able to perform (x) per full discharge cycle of the battery pack, as compared to the number of repeated cuttings achievable by the same saw not employing a regenerative braking means (y) per full discharge cycle of the battery pack, such that x/y is approximately at least one of the following: i) 1.1 when cutting a Pressure-Treated (PT) lumber workpiece having a cross-sectional size of approximately 89 mm×89 mm±2 mm, ii) 1.15 when cutting a Spruce Pine Fir (SPF) lumber workpiece having a cross-sectional size of approximately 38 mm×89 mm±2 mm, or iii) 1.25 when cutting Medium Density Fiberboard (MDF) workpiece having a thickness of approximately 19 mm±1 mm and a width of approximately 76 mm±2 mm.

12. The system of claim 11, wherein the electric charge applied to the battery pack is on average at least 33% of the average charge derived from the battery pack over a full discharge cycle of the battery pack.

13. The system of claim 11, wherein, when the saw blade has a diameter of 304.8 mm±4 mm, the saw is capable of performing, per full discharge cycle of the battery pack, at least 25.3 number of cuts per amp.hour of battery capacity when operating on the Pressure-Treated (PT) lumber workpiece, at least 40 number of cuts per amp.hour of battery capacity when operating on the Spruce Pine Fir (SPF) lumber workpiece, or at least 52 number of cuts per amp.hour of battery capacity when operating on the Medium Density Fiberboard (MDF) workpiece.

14. The system of claim 11, wherein the duration of the ramp-down period is 1.3 to 1.8 times longer than the duration of the start-up period.

15. The system of claim 11, wherein the duration of the ramp-down period is approximately 25% to 36% of the duration of the entire cutting operation.

* * * * *